US005714188A

United States Patent [19]
Gilchrist

[11] Patent Number: 5,714,188
[45] Date of Patent: Feb. 3, 1998

[54] METHOD OF PROCESSING MEAT

[76] Inventor: Caleb L. Gilchrist, P.O. Box 730, Langston, Okla. 73050

[21] Appl. No.: 712,856

[22] Filed: Sep. 12, 1996

[51] Int. Cl.[6] .................................................. A23L 1/318
[52] U.S. Cl. ........................... 426/281; 426/331; 426/332; 426/442; 426/519; 426/652
[58] Field of Search .................................. 426/281, 312, 426/331, 332, 641, 650, 652, 442, 506, 519; 99/535

[56] References Cited

U.S. PATENT DOCUMENTS

| | | | |
|---|---|---|---|
| 1,635,302 | 7/1927 | Alsberg | 426/264 |
| 1,951,436 | 3/1934 | Paddock | 99/1 |
| 2,224,397 | 12/1940 | Komarik | 99/108 |
| 2,238,546 | 4/1941 | Williams et al. | 99/174 |
| 2,812,262 | 11/1957 | Wasserman | 99/222 |
| 2,974,047 | 3/1961 | Holmes | 99/174 |
| 3,928,634 | 12/1975 | Gasbarro | 426/281 |
| 4,036,122 | 7/1977 | Langen | 426/281 X |
| 4,214,518 | 7/1980 | Petsche | 99/535 |
| 4,229,458 | 10/1980 | Dreano et al. | 426/281 |
| 4,254,151 | 3/1981 | Townsend | 426/231 |
| 4,264,631 | 4/1981 | Rose | 426/247 |
| 4,446,779 | 5/1984 | Hubbard et al. | 99/535 X |
| 4,463,026 | 7/1984 | Chandler et al. | 426/652 |
| 4,520,718 | 6/1985 | Prosenbauer | 99/535 |
| 5,071,666 | 12/1991 | Handel et al. | 426/281 |
| 5,084,286 | 1/1992 | Moody | 426/281 |
| 5,200,223 | 4/1993 | Simonsen | 426/281 |
| 5,489,443 | 2/1996 | Knipe et al. | 426/281 X |

OTHER PUBLICATIONS

Gorshkova et al., "Beef curing under electrical and mechanical effects", Proceedings of the European Meeting of Meat Research Workers, vol. III. (32), pp. 22–24, 1986.

Article entitled, "Vacuum Massaging: A Basic Approach", Meat Processing, pp. 42–48, Feb. 1982.

Addis, P.B. et al., "Massaging and Tumbling in the Manufacture of Meat Products", Food Technology, pp. 36–40, Apr. 1979.

Woolen, A., "Growing Interest in Meat Tumbling", Food Manufacture, pp. 35–36, Oct. 1971.

Johnson, V. et al., "An Accelerated Cure for Bacon", Food Technology, pp. 354–358, Sep. 1952.

Suter, D.A. et al., "A Method for Measurement of the Effect of Blood Protein Concentrates on the Binding Forces in Cooked Ground Beef Patties", J. Food Sci., 41:1428–1432, 1976.

Gornall, A.G. et al., "Determination of Serum Proteins by Means of the Biuret Reaction", J. Biol. Chem., 177:751–766, 1949.

Primary Examiner—Milton Cano
Attorney, Agent, or Firm—William R. Sharp

[57] ABSTRACT

A method of processing meat comprises: injecting the meat with a brine which is at a temperature of about 30° C. to about 45° C.; and then agitating the meat. The agitating step can comprise mixing and tumbling of the meat. The final meat product can be produced by stuffing the meat into a mold and then cooking.

11 Claims, 3 Drawing Sheets

METHOD OF PROCESSING MEAT

BACKGROUND OF THE INVENTION

This invention relates to processing of meat using brine.

Major efforts have recently been made to reduce the fat content in cattle and hogs. Reducing the fat content in animals, especially hogs, has contributed to the increased occurrence of porcine stress syndrome (PSS). Hogs having this syndrome develop pale, soft, and exudative (PSE) meat after slaughter. PSE reduces protein solubility in pork muscle, which adversely affects the water-holding capacity, color, yield, and texture in meat products. In addition, the binding characteristics of salt-soluble proteins are lowered, thus decreasing the moisture and texture of sausages and ham products.

Research efforts with PSE have focused on three general areas: (1) the reversal of protein denaturation by enzymatic reactions; (2) chilling carcasses at extremely cold temperatures to diminish the PSE properties; and (3) the process of breeding, feeding, and preslaughter treatment to control final pH values of carcasses. A low pH of below 5.8 has been associated with PSE. These procedures are beneficial to the meat industry, but it would be desirable to develop a new method for overcoming PSE problems at the point of product manufacture.

SUMMARY OF THE INVENTION

It is, therefore, an object of the invention to provide a method of processing meat at the point of product manufacture which has beneficial effects on protein solubility, water-holding capacity, and binding strength, particularly in the case of PSE pork.

The above object is realized by a method of processing meat comprising: injecting the meat with a brine which is at a temperature of about 30° C. to about 45° C.; and then agitating the meat. The agitating step preferably comprises tumbling and mixing, and can be followed by stuffing the meat into a mold and then cooking. The final meat product, even PSE meat, has desirably high protein solubility, water-holding capacity, and binding strength.

DETAILED DESCRIPTION OF THE INVENTION

Figure 1:
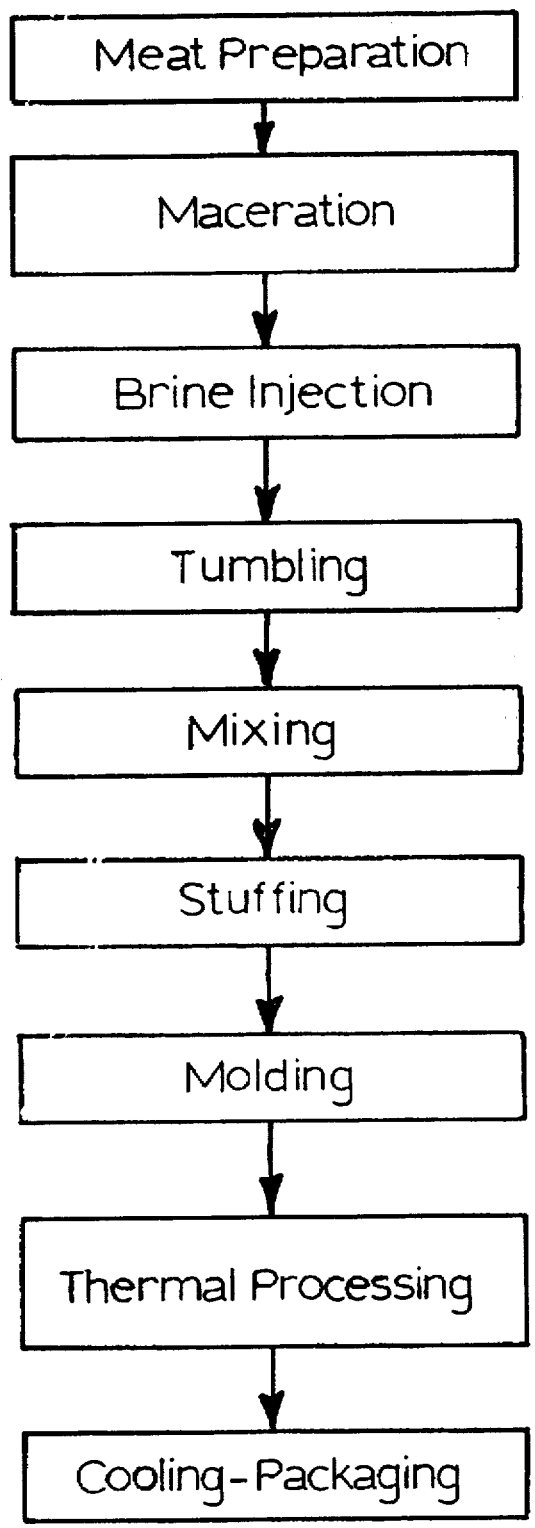
FIG. 1 is a flow chart illustrating the steps of a preferred method in accordance with the invention.

A preferred embodiment of the invention is illustrated by the flow chart of FIG. 1 and is described below.

Some terms used herein and in the appended claims will first be defined.

The term "brine" means an aqueous solution which contains salt, but which can contain other ingredients such as phosphates, nitrite, and erythorbate.

The term "mixing" means a method of agitation which employs moving paddles or blades in a mixing chamber.

The term "tumbling" means a method of agitation which employs a rotating drum.

The method of the invention is applicable to virtually any meat, including beef, pork, lamb, chevon, chicken, and fish, but it is particularly applicable to pork. In the description below, the generic term "meat" will be used so as to not be limited to any particular type of meat.

The meat is first appropriately prepared by segmenting a carcass into various cuts, and trimming such cuts to remove all skin, subcutaneous fat, and some connective tissue. A cut of meat is selected for brine injection. First, however, the meat is subjected to maceration in which cuts or punctures are made, typically about ⅛ inch below the surface.

The brine preferably comprises about 74-76 weight percent water, about 10.98-12.01 weight percent sodium chloride, about 10.98-12.01 weight percent corn syrup solids, about 1.67-1.69 weight percent sodium tripolyphosphate, about 0.26-0.28 weight percent sodium erythorbate, and about 0.05-0.07 weight percent sodium nitrite. The brine is heated by any suitable means, such as an electrical water bath container, hot plate, or ultrasonic tank, to a temperature of about 30° C. to about 45° C., most preferably about 35° C. to about 40° C.

The heated brine is injected into the meat (at a preferred temperature of about 1° C. to about 7° C.) by preferably using an injection machine that injects the brine through multiple needles which penetrate the meat. Typically, such an injection machine has 20 to 30 needles. With respect to the amount of brine injected, the weight ratio of brine to meat is preferably about 1:20 to about 1:2. A typical weight ratio is 1:5. After brine injection, the meat is preferably allowed to set for about 10 to about 20 minutes. The meat is then preferably cut into chunks.

The chunks are preferably subjected to tumbling in a tumbling machine which can include internal baffles if desired. The tumbling machine is loaded with chunks to approximately ½ to ⅔ full, and the chunks can be tumbled under vacuum or atmospheric conditions. The speed of the tumbling machine is preferably about 15 RPM to about 25 RPM. Tumbling time is preferably about 6 hours to about 24 hours, and is understood to include rest intervals to allow protein extraction and brine absorption.

The chunks are withdrawn from the tumbling machine, and are preferably subjected to mixing for about 5 minutes to about 15 minutes. For PSE pork, the mixing time is preferably at least 10 minutes. Mixing speed is typically about 40 RPM to about 50 RPM.

To produce a final meat product of a desired shape after mixing, the meat can be stuffed into a mold. The meat while still in the mold is preferably thermally processed, i.e. cooked, using a suitable cooking cycle. The final meat product can be removed from the mold after cooling and then further processed in any desired manner. For example, the final meat product can be sliced and vacuum packaged.

Obviously, many modifications and variations of the present invention are possible in light of the above teachings. For example, according to broad aspects of the invention, other forms of agitation can be used, such as massaging. In addition, according to the embodiment described above, either mixing or tumbling could be used alone. It is, therefore, to be understood that within the scope of the appended claims, the invention can be practiced otherwise than as specifically described.

EXAMPLE

This example is provided to further illustrate the invention, and should not be construed to limit the invention in any manner.

A number of pork carcasses were selected for use in the following tests. Each carcass was split into a left side and a right side. All right sides of carcasses were subjected to thermal processing for 4 hours in an Alkar-DEC oven to an internal temperature of 37.7° C. at 95% relative humidity to induce PSE pork. These sides were subsequently chilled for 24 hours at 4° C. along with the left side carcasses. Each side was segmented into loins and hams, which were subsequently trimmed to remove all skin, subcutaneous fat, and connective tissue. This was followed by maceration of the hams and loins.

The hams and loins were injected with a brine using a Fomaco® injection machine (Reiser, Inc., Canton, Mass.). The brine was comprised of 76 wt. % water, 10.98 wt. % sodium chloride, 10.98 wt. % corn syrup solids, 1.69 wt. % sodium tripolyphosphate, 0.28 wt. % sodium erythorbate, and 0.07 wt. % sodium nitrite. The brine was injected at a temperature of either 38° C. or 13° C. (control). The quantity of brine injected was 20% the weight of the ham or loin, a weight ratio of brine to meat of 1:5. After injection, the hams and loins were allowed to set about 15 minutes before being sectioned into 4.5×4.5 cm chunks. Chunks were either subjected to tumbling (4 hour run and 4 hour rest interval) or not subjected to tumbling. Tumbling was carried out under vacuum conditions in a tumbling machine (Inject Star, Inc., Brookfield, Conn.) having internal baffles. All chunks were further processed in a Leland mixer (Leland Detroit Mfg. Co., Detroit, Mich.) for 10 minutes, followed by placing chunks in a Vemag® stuffer (Reiser Inc., Canton, Mass.) and stuffing them into polylined stainless steel molds (Charles Abram, Inc., Philadelphia, Pa.) with rectangular dimensions of 8.5×8.5×68 cm. A conventional cooking cycle of 4 hours was used in which the oven temperature for the first hour is at 49° C., the oven temperature for the second hour is at 60° C., followed by raising the oven temperature to 77° C. and holding until the internal meat temperature reaches 67° C. The meat products were then showered for 60 minutes and removed from their molds. This was followed by chilling for approximately 12 to 14 hours in a 4° C. cooler.

Protein Solubility

Raw meat samples were taken from the above described procedure prior to stuffing. Meat samples were frozen in liquid nitrogen and blended to form a powdery consistency. 2 g samples were placed in 50 ml centrifuge tubes containing a buffer comprising $KPO_4$ (50 mM) and KCl (100 mM). Samples were diluted to a 1:15 (w:v) basis (weight of sample to volume of buffer) and homogenized for 30 seconds using a biohomogenizer model 133 (Biospec Products Inc., Bartlesville, Okla.). A total of 48 samples were prepared, of which: 6 samples were normal meat injected with 38° C. brine and subjected to tumbling; 6 samples were PSE meat injected with 38° C. brine and subjected to tumbling; 6 samples were normal meat injected with 38° C. brine and not subjected to tumbling; 6 samples were PSE meat injected with 38° C. brine and not subjected to tumbling; 6 samples were normal meat injected with 13° C. brine and subjected to tumbling; 6 samples were PSE meat injected with 13° C. brine and subjected to tumbling; 6 samples were normal meat injected with 13° C. brine and not subjected to tumbling; and 6 samples were PSE meat injected 13° C. brine and not subjected to tumbling.

For each sample, soluble protein percentage was measured by the Biuret method as described in *Determination of Serum Proteins by Means of the Biuret Reaction*, by Gornall et al., *J. Biol. Chem.*, 177:751–766, 1949. A mean soluble protein percentage was obtained for each group of 6 samples. Such mean soluble protein percentages are plotted in the graph of FIG. 2, where "N" represents normal meat and "P" represents PSE meat. A dotted or dashed line has been drawn between normal and PSE points that share the same brine injection and tumbling status. The notation "8 hr. tumbling" refers to a tumbling operation having a 4 hour run time and a 4 hour rest interval. "0 hours tumbling" means there was no tumbling.

Figure 2:
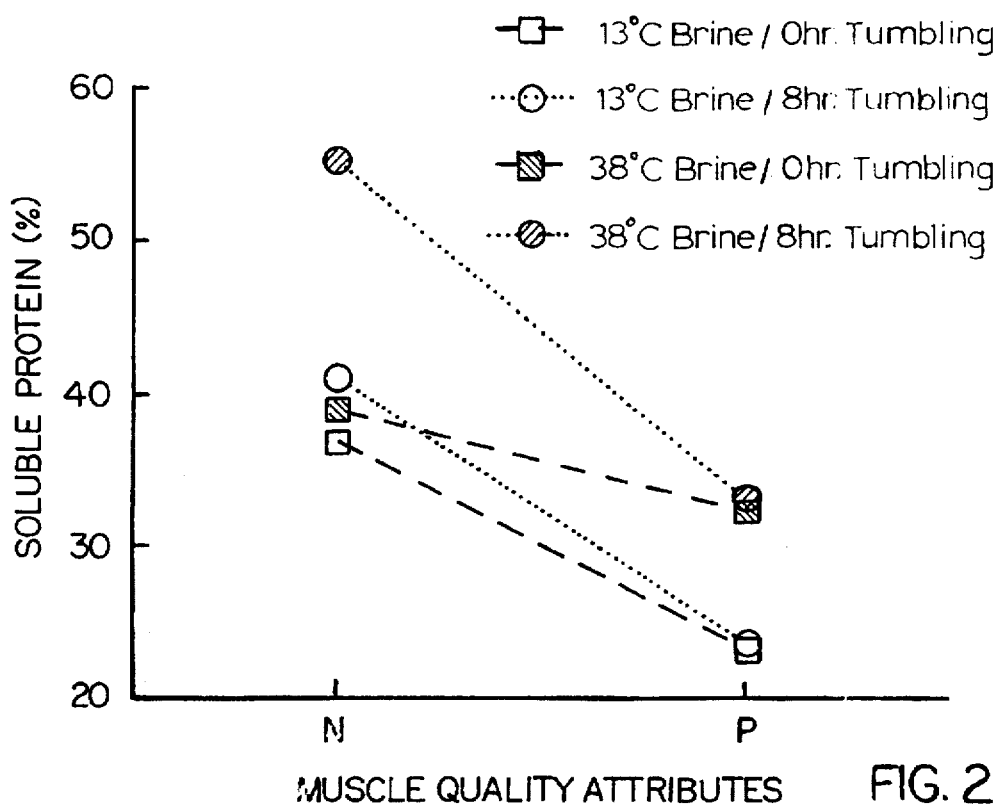
FIGS. 2-5 are graphs which show test results from an example.

The graph of FIG. 2 shows that the soluble protein percentage is higher for PSE meats injected with 38° C. brine, with or without tumbling. For normal meats, the point associated with 38° C. brine injection and tumbling has the highest soluble protein percentage, whereas the point associated with 38° C. brine injection and no tumbling is at a significantly lower soluble protein percentage close to the percentages for those points associated with 13° C. brine injection. The lines are intended to give a clearer graphical comparison of the plotted data. For example, it can be clearly seen from the slope of each line that soluble protein percentages for normal meat are consistently higher than PSE meats.

Water-Holding Capacity and Smokehouse Yield

Figure 3:
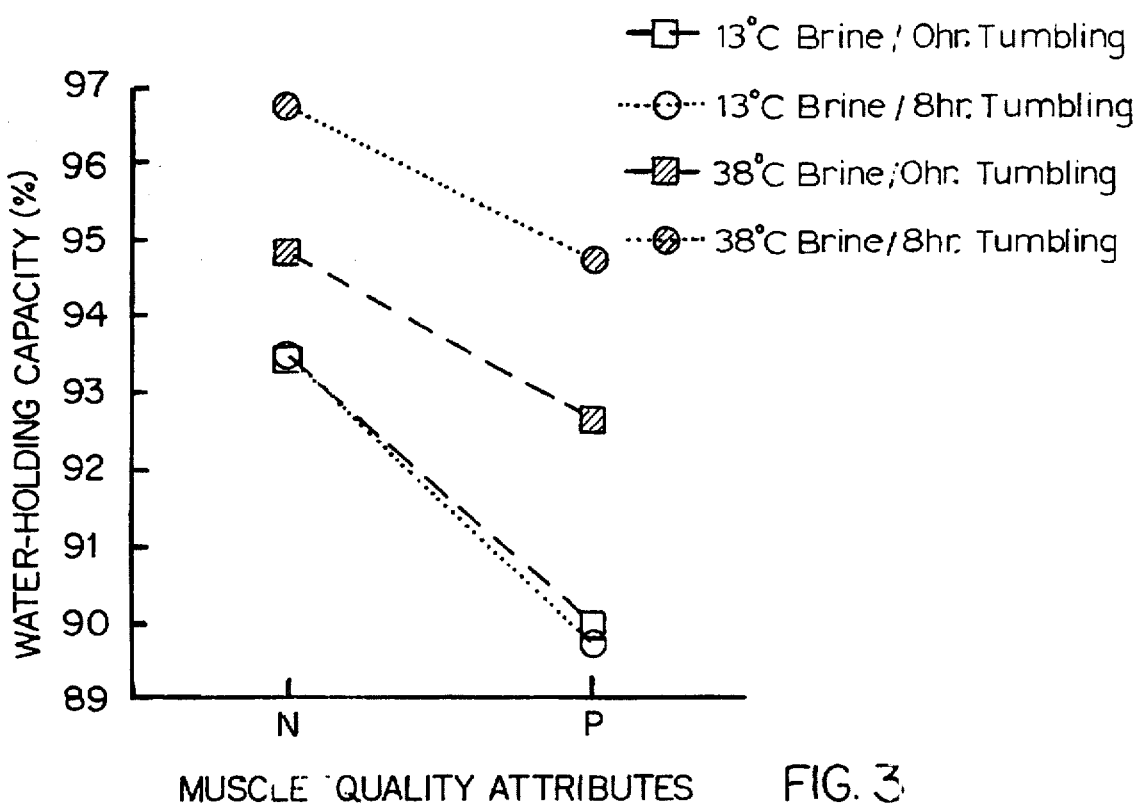

Raw meat samples (5 g) were taken from the above-described procedure prior to stuffing. Samples were placed into 50 ml centrifuge tubes, which were weighed. The tubes were placed in a boiling water bath for 20 minutes. Tube contents were cooled and drained off. Meat samples were blotted with filter paper and subsequently placed back into the tubes for reweighing. The water-holding capacity was calculated on a percentage basis: (final cooked weight/ uncooked weight)×100=water-holding capacity (%). As in the protein solubility tests, 8 groups of samples, with each group having 6 samples, were employed to derive 6 water-holding capacity values per group. A mean of these values was calculated to plot points in the graph of FIG. 3. FIG. 3 shows water-holding capacity percentages for samples injected with 38° C. brine as exceeding those percentages for samples injected with 13° C. brine. FIG. 3 also shows that the highest water-holding capacity percentages are obtained for samples injected with 38° C. brine and subjected to tumbling. In a similar manner to protein solubility, water-holding capacity percentages for normal samples consistently exceed those for PSE samples.

Figure 4:
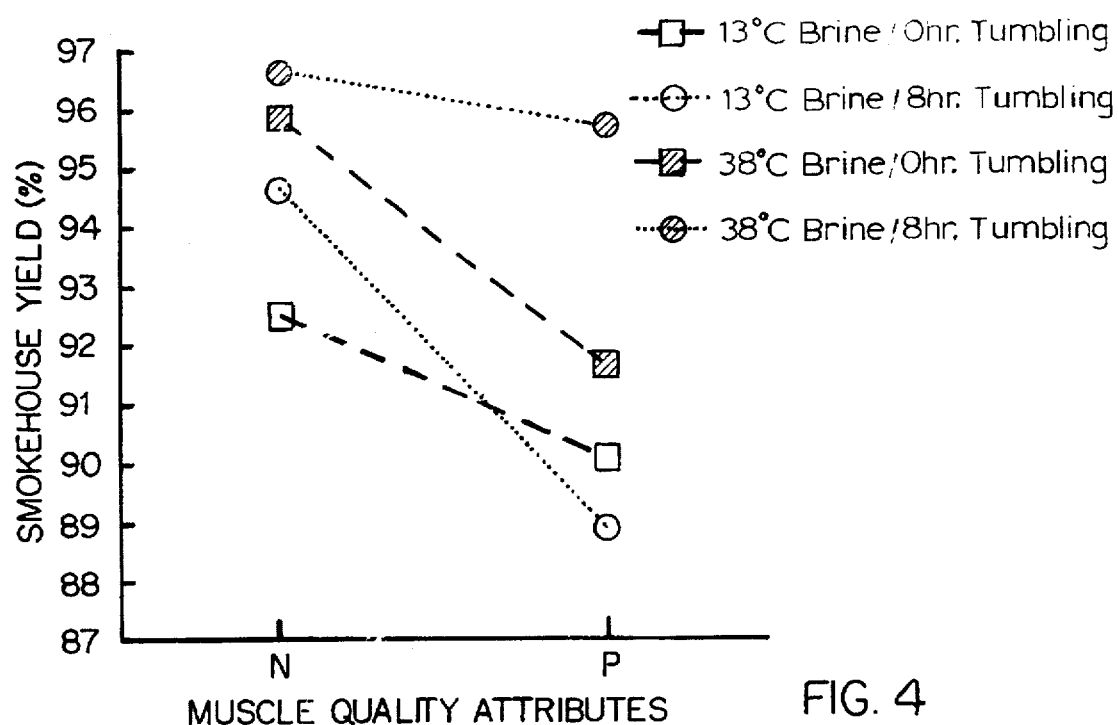

In a separate experiment, molded meat samples were cooked in a smokehouse in accordance with the previously described 4 hour cooking cycle. The molded meat samples were weighed prior to cooking and then after cooking. The smokehouse yield was calculated ((final cooked weight/ uncooked weight)×100) for 8 groups of samples, with each group having 6 samples from which a mean smokehouse yield was determined. Referring to the graph of FIG. 4, the results are somewhat similar to the results shown in FIG. 3.

Binding Evaluation

Figure 5:
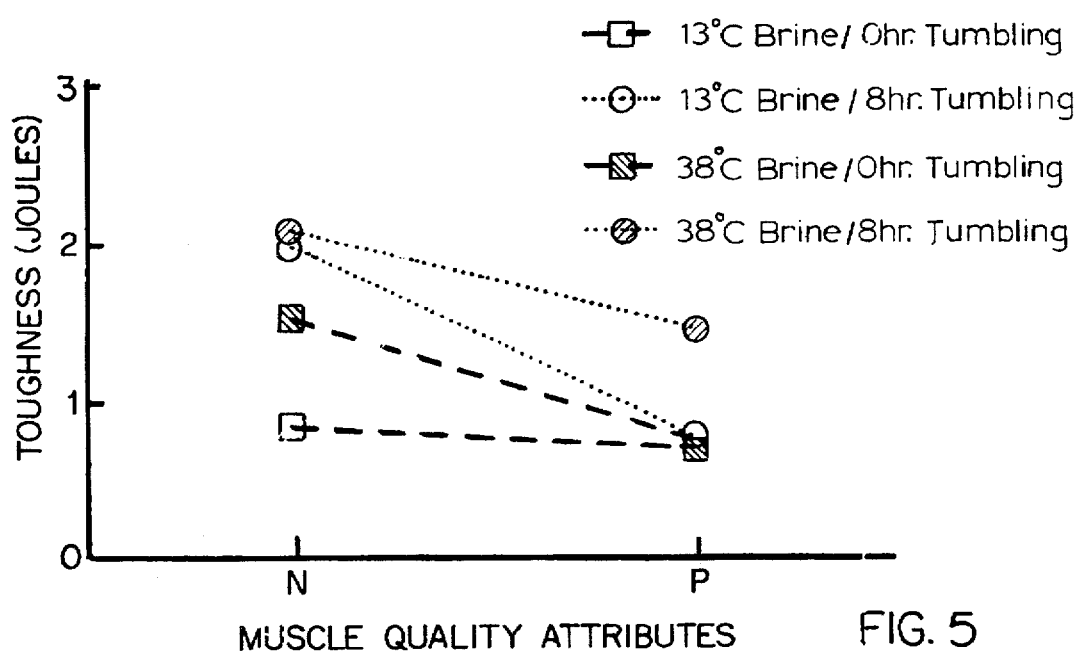

Cooked meats from the above described procedure were allowed to equilibrate at room temperature and a sliced section was placed in a tensile testing device which held the slice by pins. Binding strength analysis was performed as described in "A Method for Measurement of the Effect of Blood Protein Concentrates on the Binding Forces in Cooked Ground Beef Patties", by D. A. Suter et al., *J. Food Sci.*, 41:1428–1432, 1976. Dimensions of the cooked slice was 8.7 cm in length, 5.6 cm in width, and 8 mm thick. Sample rate and crosshead speed were 10 pts/sec and 100 mm/min, respectively. A total of 216 sliced samples were tested for toughness, with 8 groups of 27 samples. A mean is calculated for each group and plotted in FIG. 5. The results show that the samples injected with 38° C. brine and tumbled have the highest toughness in normal and PSE meats. For other PSE samples, the toughness is fairly uniform regardless of brine injection and tumbling. Results are varied for other normal samples.

That which is claimed is:

1. A method of processing meat comprising:

injecting the meat with a brine which is at a temperature of about 30° C. to about 45° C.;

tumbling the meat; and mixing the meat.

2. A method as recited in claim 1 wherein said temperature is about 35° C. to about 40° C.

3. A method as recited in claim 2 wherein said temperature is about 38° C.

4. A method as recited in claim 3 wherein the weight ratio of the brine to the meat is about 1:20 to about 1:2.

5. A method as recited in claim 4 wherein the weight ratio of the brine to the meat is about 1:5.

6. A method as recited in claim 5 wherein the time of mixing is about 5 to about 15 minutes, and the time of tumbling is about 6 hours to about 24 hours.

7. A method as recited in claim 6 wherein the mixing time is about 10 minutes and the tumbling time is about 8 hours with a 4 hour run time and a 4 hour rest interval.

8. A method as recited in claim 7 further comprising, after mixing, stuffing the meat into a mold, followed by cooking of the meat to result in a final processed meat product.

9. A method as recited in claim 8 wherein the meat is pork.

10. A method of processing meat comprising:

macerating the meat;

injecting the meat with a brine which is at a temperature of about 35° C. to about 40° C., wherein the meat is at a temperature of about 1° C. to about 7° C.;

tumbling the meat;

mixing the meat;

stuffing the meat into a mold; and cooking the meat.

11. A method as recited in claim 10 wherein the brine comprises water, sodium chloride, corn syrup solids, sodium tripolyphosphate, sodium erythorbate, and sodium nitrite.

* * * * *